United States Patent Office 3,291,862
Patented Dec. 13, 1966

3,291,862
CHLORINATED POLYOLEFIN POLYMER MIXTURES
Walter B. Armour, Plainfield, N.J., and Michael P. Diamantopoulos, Winchendon, Mass., assignors to National Starch and Chemical Corporation, New York, N.Y., a corporation of Delaware
No Drawing. Filed Aug. 3, 1962, Ser. No. 214,519
10 Claims. (Cl. 260—897)

This invention relates to a method for the preparation of novel polymeric compositions, and more particularly polyolefin polymer mixture compositions, as well as to the compositions thus prepared.

It is an object of this invention to provide novel polymeric compositions which exhibit outstanding properties of adhesive strength and fire retardation. Another object of this invention is to provide a rapid, economical method of preparing said polymeric compositions. Still another object of this invention is to utilize these polymeric compositions in the preparation of adhesives which are characterized by their ready adhesion to a wide variety of substrates. Other objects and the advantages of this invention will be apparent from the following description thereof.

Polypropylene is a synthetic resin which, of late, has enjoyed greatly increased usage in the preparation of molded articles, fibers, and films. For use in the latter applications it is desirable that the polypropylene should have a highly crystalline structure which thereby serves to increase the strength of this versatile plastic. The inherent crystallinity of polypropylene is, in turn, dependent upon its molecular structure or configuration. Thus, crystalline polypropylene molecules will exhibit a so-called isotactic structure wherein the methyl groups will be regularly distributed on the same side of the polymer chain in a manner analogous to that shown in the following diagram:

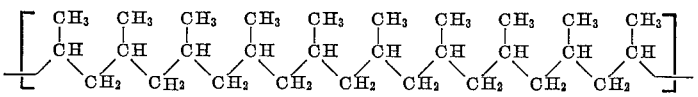

On the other hand, polypropylene which is not crystalline will exhibit a so-called atactic structure wherein the methyl groups are randomly distributed on either side of the polymer chain in a manner analogous to that shown in the following diagram:

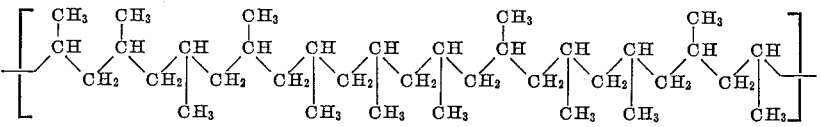

In manufacturing polypropylene, the processes currently employed make use of so-called stereospecific catalysts which are chosen for their ability to provide the resulting polypropylene with an isotactic structure and thereby impart a maximum degree of crystallinity to the polymer. However, despite the use of these catalysts, present polymerization techniques still produce a product with a significant proportion of atactic polypropylene. The presence of this non-crystalline fraction would, of course, detract from the strength of any article manufactured from such polypropylene. Therefore, it is the practice in the art to separate this atactic portion from the crystalline material and this is readily accomplished by means of a solvent extraction technique. To date, very few applications have been found for this atactic polypropylene residue. Its inherent lack of crystallinity obviates its use in the preparation of films, fibers and molded products; while any use of this material as an adhesive base is similarly ruled out since the resulting adhesive films are exceedingly soft and display very little strength.

Ethylene:propylene copolymers are extensively used in the manufacture of molded products. These copolymers have not generally been utilized in the preparation of adhesives because of their characteristically high viscosity at low solids content and because of their relatively low bond strength.

We have now discovered that novel polymeric compositions which are characterized by outstanding adhesive strength and facility of preparation can be prepared from atactic polypropylene and ethylene:propylene copolymers. These compositions are further characterized by their ready adhesion to a variety of substrates and by their solubility in organic solvents. This latter property thus allows the polymeric compositions of our invention to be conveniently and economically formulated with a wide variety of additives.

In accordance with the invention, atactic polypropylene and ethylene:propylene copolymers are blended in the form of an organic solvent solution which is then chlorinated in the presence of a suitable free radical initiator, thereby yielding a chlorinated polymer mixture which exhibits unusually good adhesive properties and solubility characteristics. The novel compositions of our invention are, in effect, chlorinated polymeric compositions wherein the two components from which they are derived, viz., the atactic polypropylene and the ethylene:propylene copolymer, are chemically bonded to one another.

Surprisingly, the properties of our polymer mixtures differ considerably from the characteristics of physical blends of chlorinated atactic polypropylene and a chlorinated ethylene:propylene copolymer. Our chlorinated polymer mixtures are more soluble in organic solvents than the aforementioned physical blends. Moreover, films derived from solutions of our polymer mixtures possess considerably greater tensile strength than the simple blends of chlorinated atactic polypropylene and a chlorinated ethylene:propylene copolymer.

In the process of our invention, separate solutions of atactic polypropylene and of an ethylene:propylene copolymer are blended and thereafter subjected to a chlorination procedure in the presence of a free radical catalyst or initiator. The chlorine may be introduced by bubbling chlorine gas directly into the reaction mixture or by refluxing the latter in the presence of sulfuryl chloride, or by any of the conventional methods utilized to chlorinate a mixture, such as, treatment with thionyl chloride or treatment with phosphorous pentachloride.

When chlorination is effected by passing chlorine gas into the reaction mixture, the reaction temperature may range from about 20° C. up to the reflux temperature of the mixture, while still higher temperatures may be employed under conditions of increased pressure. The free radical initiator or catalyst is employed in a concentration of from 0.1% to 1.0%, by weight, as based on the total weight of the polymer blend which is being reacted. These catalysts are usually solvent soluble organic peroxides, such as benzoyl or lauroyl peroxide. In general, the reaction time is approximately 8 hours, with the reaction solution being continually agitated throughout this period. When chlorination is effected by refluxing the mixture in sulfuryl chloride, the reaction temperature should always be the reflux temperature of the mixture. For the purposes of this invention, the chlorinated polymer mixtures obtained by means of our procedure may contain from about 10% to about 60%, by weight, of chlorine.

The solvents which are used to dissolve the components of the reaction mixture, viz., the atactic polypropylene and the ethylene:propylene copolymers, must not be susceptible to chlorination. The solvents most commonly employed in our invention include carbon tetrachloride, methylene chloride, dichloroethane, tetrachloroethane, chloroform, and similar materials.

As was mentioned previously, the chlorination reaction occurs in the presence of a free radical initiator which acts as a catalyst for the reaction. Typical catalysts applicable to our process include benzoyl peroxide, lauroyl peroxide, dicumyl peroxide, and the like. In general, about 0.1% to about 1.0%, by weight, of the selected catalyst is used, as based on the total weight of the initial polymers being subjected to the process of our invention. The reaction mixture of our invention should contain a ratio of atactic polypropylene:ethylene:propylene copolymer ranging from 30:70 to 70:30. The total solids content of the reaction mixture is limited only by the solubility of the components of the mixture and its resultant viscosity. Particularly effective results were obtained by employing mixtures having a concentration of solids varying from 5% to 20%, by weight.

The ethylene:propylene copolymers used in preparing the polymers of our invention enhance the properties of the polymers. Thus, the presence of these copolymers, as an integral component of our novel polymer mixtures, provide the latter with toughness, increased viscosity, and good resistance to deterioration resulting from attack by oxygen or ozone. The ethylene:propylene copolymers which can be used in preparing the polymer mixtures of this invention should have a Mooney viscosity ranging from 20 to 90 and a ratio of ethylene:propylene ranging from 60:40 to 70:30, by weight.

Various modifying agents, extenders, and curing agents may also be formulated with the chlorinated polymer mixtures of our invention so as to further modify their properties. Among the modifying agents and extenders which can be admixed with our novel polymer mixtures there may be included: high molecular weight rosin esters, chlorinated biphenyl resins, and fillers such as calcium carbonate, asbestos, talc, and mica. These modifying agents and extenders are generally used in amounts up to 150 parts of the particular additive per 100 parts of the polymer mixture. It is also possible to cure the films which are derived from our novel polymer mixtures by formulating the latter with a curing agent such as dicumyl peroxide, lauroyl peroxide, benzoyl peroxide, zinc oxide, and the like. These curing agents function to crosslink or vulcanize the films derived from our polymer mixtures and thereby increases their strength and binding ability. These curing agents are commonly utilized in amounts varying from 0.5% to 2.0% by weight, as based on the weight of the polymer mixture.

In formulating adhesives from our novel chlorinated polymer mixtures, such adhesives may be utilized in the form of the lacquers wherein they were prepared, or these lacquers may, in turn, be converted to aqueous emulsions prior to their use. Thus, the polymer mixture lacquers may be readily emulsified by adding an aqueous solution of an emulsifier to the lacquer while the lacquer is being vigorously agitated. It should also be noted that our chlorinated polymer mixtures may be further formulated with inexpensive hydrocarbon solvents, such as pentane and hexane. This versatility is in contrast to many other synthetic resins used as adhesive bases which must be blended with costly aromatic or ketone solvents.

In using the chlorinated polymer mixtures of our invention as adhesives, they may be applied to substrates by means of coating techniques well known to the practitioner. Thus, these adhesives may be sprayed onto a substrate or they may be applied by the use of any mechanical coating process, such as the trailing blade, reverse roll, or roller coating techniques. The coating weights at which these adhesives may be applied will vary, of course, according to the specific end use application.

The adhesives derived from our chlorinated polymer mixtures may be coated onto a virtually unlimited variety of both flexible and rigid substrates including paper, cloth, paperboard, metal sheets and foils, fiber glass, foamed plastics such as those derived from polystyrene and polyurethanes, rubber, cellophane, wood, plastic films and sheets such as those derived from polyethylene terephthalate, polystyrene, rubber hydrochloride, polyethylene, isotactic polypropylene, polyvinyl chloride, and polyvinylidene chloride. These adhesives may also be used for the bonding or lamination of any of the above listed materials.

In the following examples, which further illustrate the embodiment of this invention, all parts given are by weight unless otherwise indicated.

*Example 1*

This example illustrates the preparation of several of our novel chlorinated polymer mixtures by means of the process of our invention.

(a) Organic solvent solutions of the atactic polypropylene and of the ethylene:propylene copolymer were first prepared with the process of solution being assisted by refluxing and agitation of the mixture. The resulting solutions were then agitated and heated to reflux. While the thus prepared solutions were being maintained at constant reflux, the free radical catalyst was added and soon dissolved in the mixture. Sulfuryl chloride was then slowly added. The mixtures were maintained at reflux for periods of time ranging from 5 to 10 hours, thereby yielding the chlorinated polymer mixture compositions of our invention.

The following table presents the compositions of several formulations prepared by means of the procedure described hereinabove and also provides other details relating to their preparation.

| Formulation No. | Ethylene:Propylene Copolymer | | | Parts of Atactic Poly-propylene | Parts of Benzoyl Peroxide | Parts of carbon tetra-chloride | Parts of Sulfuryl Chloride | Reaction Temperature (° C.) | Reaction Time (Hours) | Percent chlorine in the polymer mixture |
|---|---|---|---|---|---|---|---|---|---|---|
| | Parts | Mooney Viscosity | Ethylene:propylene ratio | | | | | | | |
| 1 | 70 | 20 | 60:40 | 30 | 0.1 | 1,100 | 190 | 77 | 10 | 61.2 |
| 2 | 50 | 30 | 60:40 | 50 | 1.0 | 1,900 | 150 | 77 | 10 | 50.7 |
| 3 | 30 | 50 | 60:40 | 70 | 0.3 | 500 | 160 | 77 | 10 | 59.6 |
| 4 | 50 | 50 | 70:30 | 50 | 0.5 | 900 | 65 | 77 | 5 | 1.9 |

| Formulation No. | Ethylene:Propylene Copolymer | | | Parts of Atactic Poly-propylene | Parts of Lauroyl Peroxide | Parts of Methylene chloride | Parts of Sulfuryl Chloride | Reaction Temperature (° C.) | Reaction Time (Hours) | Percent chlorine in the polymer mixture |
|---|---|---|---|---|---|---|---|---|---|---|
| | Parts | Mooney Viscosity | Ethylene:propylene ratio | | | | | | | |
| 5 | 70 | 20 | 67:33 | 30 | 0.5 | 1,100 | 190 | 41 | 10 | 58.3 |
| 6 | 50 | 30 | 67:33 | 50 | 0.3 | 900 | 150 | 41 | 10 | 47.7 |
| 7 | 30 | 60 | 67:33 | 70 | 0.5 | 500 | 160 | 41 | 10 | 61.2 |
| 8 | 50 | 30 | 60:40 | 50 | 0.5 | 900 | 65 | 41 | 5 | 28.2 |

(b) Solutions of atactic polypropylene and of ethylene:propylene copolymers were blended with the process of solution being assisted by agitation and heating of the mixture to a temperature of 40° C. The thus prepared solutions were maintained at a temperature of 40° C. while the lauroyl peroxide catalyst was added, whereupon chlorine gas was passed into the solution. The mixtures were reacted for periods of time ranging from 3 to 10 hours, thereby yielding the chlorinated polymer mixture compositions of our invention.

The following table presents the compositions of several formulations prepared by means of the procedure described hereinabove and also provides other details relating to their preparation.

| Formulation No. | Ethylene:Propylene Copolymer | | | Parts of Atactic Poly-propylene | Parts of Lauroyl Peroxide | Parts of carbon tetra-chloride | Parts of Chlorine | Reaction Temperature (° C.) | Reaction Time (Hours) | Percent chlorine in the polymer mixture |
|---|---|---|---|---|---|---|---|---|---|---|
| | Parts | Mooney Viscosity | Ethylene:propylene ratio | | | | | | | |
| 1 | 70 | 20 | 60:40 | 30 | 0.5 | 1,100 | 91 | 45 | 8 | 37.7 |
| 2 | 50 | 30 | 60:40 | 50 | 0.3 | 900 | 140 | 45 | 10 | 58.6 |
| 3 | 30 | 60 | 60:40 | 70 | 0.5 | 400 | 140 | 45 | 10 | 61.2 |
| 4 | 50 | 30 | 60:40 | 50 | 0.3 | 900 | 47 | 45 | 3 | 24.2 |

*Example II*

This example illustrates the formulation of our novel polymer mixtures with various modifying agents in the preparation of adhesive formulations.

Portions of a methylene chloride lacquer of a chlorinated polymer mixture were employed in the preparation of the various formulations set forth in the table appearing below. The chlorinated polymer mixture lacquer utilized in these formulations was prepared according to the procedure of Example I(a), using an ethylene:propylene copolymer having a Mooney viscosity of 30 and 60:40 ethylene:propylene ratio. This mixture polymer had a total chlorine content of 47% by weight.

| Component | Formulation No. | | | | | |
|---|---|---|---|---|---|---|
| | 1 | 2 | 3 | 4 | 5 | 6 |
| Chlorinated polymer mixture | 100 | 100 | 100 | 100 | 100 | 100 |
| Rosin ester (specific gravity=1.085; softening point=83° C.; acid No.=<10) | 10 | | | | | |
| Chlorinated biphenyl resin (specific gravity=1.67; softening point=100° C.; chlorine content=60%) | | 2 | 11 | 5 | 5 | 5 |
| Calcium carbonate | | | 5 | | | |
| Asbestos | | | | 11 | | |
| Talc | | | | | 5 | |
| Mica | | | | | | 5 |
| Dicumyl peroxide (curing agent) | | | 0.03 | 0.12 | | |
| Lauroyl peroxide (curing agent) | | | | | 0.12 | |
| Benzoyl peroxide (curing agent) | | | | | | 0.12 |

*Example III*

This example illustrates the superior properties exhibited by the chlorinated polymer mixtures of our invention, as compared to simple physical blends of chlorinated atactic polypropylene and chlorinated ethylene:propylene copolymers.

(a) *Solubility in organic solvents.*—A chlorinated polymer mixture containing 50% chlorine, by weight, was prepared by means of the process of our invention wherein a polymer mixture comprising 50:50 atactic polypropylene:ethylene:propylene copolymer was treated with 225 parts of sulfuryl chloride. The ethylene:propylene copolymer used to prepare the polymer mixture had a Mooney viscosity of 50 and a ratio of ethylene:propylene of 60:40.

The solubility of the above described polymer mixture in various organic solvents was compared with the solubility of a physical blend of 50 parts of a chlorinated atactic polypropylene having 50% chlorine by weight and 50 parts of a chlorinated ethylene:propylene copolymer (ratio of ethylene:propylene=60:40) having 50% chlorine by weight.

The comparable solubilities of the physical blend and our polymer mixture are set forth in the following table:

| Solvent Used | Solubility of Blend | Solubility of polymer mixture |
|---|---|---|
| 50:50 hexane:acetone | Insoluble | Soluble. |
| 50:50 hexane:ethyl acetate | do | Do. |
| 50:50 hexane:methyl ethyl ketone | do | Do. |
| 50:50 hexane:methyl isobuty ketone | do | Do. |

(b) *Tensile strength, elongation, and peel strength.*—Chlorinated polymer mixtures containing different amounts of chlorine were obtained by the process of our invention. These polymer mixtures were then subjected to several tests in order to compare their properties with the characteristics of simple physical blends of chlorinated atactic polypropylene and chlorinated ethylene:propylene copolymers.

The following test procedures were employed in order to determine the tensile strength, elongation, and peel strength of both the polymer mixtures and the physical blend.

*Tensile strength.*—The polymer mixture or physical blend being tested was dissolved in methylene chloride to form a 25% solids solution. A film of the polymer mixture or blend solution was then cast onto a metal plate coated with tetrafluoroethylene polymer. The film was cut into ½" x 4" strips and these strips were then removed from the plate. The tensile strength of the strips were then determined on an Instron tensile tester at a cross head speed of 0.5 inch/minute.

*Elongation.*—The elongation of the sample being tested was determined by measuring the length of the extended film just before the film ruptured on the Instron tensile tester under the conditions described above for the tensile strength test.

*Peel strength.*—In this testing procedure, two 1" x 6" canvas strips were laminated with an adhesive lacquer derived from the polymer mixture being tested. The force needed to destroy the adhesive bond and thus pull the strips apart was determined by following the procedure set forth in testing procedure D–903–49 as prescribed by the American Society for Testing Materials.

The aforedescribed test procedures were utilized in testing the properties of the polymer mixtures and simple physical blends set forth in the following tables:

| Formulation No. | Blend | | | | | Polymer mixture ethylene:Propylene copolymer | | | Atactic polypropylene (parts) | Percent chlorine in polymer mixture |
|---|---|---|---|---|---|---|---|---|---|---|
| | Chlorinated atactic polypropylene | | Chlorinated ethylene:propylene copolymer | | | Ratio of ethylene: propylene | Mooney viscosity | Parts | | |
| | Parts | Percent chlorine | Ratio of ethylene: propylene | Parts | Percent chlorine | | | | | |
| 1(a) | 50 | 40 | 60:40 | 50 | 40 | | | | | |
| 1(b) | | | | | | 60:40 | 50 | 50 | 50 | 40 |
| 2(a) | 50 | 50 | 60:40 | 50 | 50 | | | | | |
| 2(b) | | | | | | 60:40 | 50 | 50 | 50 | 50 |
| 3(a) | 50 | 10 | 60:40 | 50 | 10 | | | | | |
| 3(b) | | | | | | 60:40 | 50 | 50 | 50 | 10 |
| 4(a) | 50 | 20 | 60:40 | 50 | 20 | | | | | |
| 4(b) | | | | | | 60:40 | 50 | 50 | 50 | 20 |
| 5(a) | 50 | 30 | 60:40 | 50 | 30 | | | | | |
| 5(b) | | | | | | 60:40 | 50 | 50 | 50 | 30 |

The results of the aforedescribed tests are set forth in the following table. In those instances where no value is given for a particular property of a polymer mixture, it is to be understood that the films derived from the particular polymer mixture were too tacky to be tested.

| Formulation No. | Tensile strength (lbs./sq. in.) | Percent elongation | Peel (lbs./in.) |
|---|---|---|---|
| 1(a) | 122 | 1,700 | 14 |
| 1(b) | 285 | 1,270 | 25 |
| 2(a) | 250 | 1,350 | 18 |
| 2(b) | 685 | 750 | 34 |
| 3(a) | | | 10 |
| 3(b) | | | 12.5 |
| 4(a) | | | 12 |
| 4(b) | | | 18.1 |
| 5(a) | | | 12.8 |
| 5(b) | 270 | 1,310 | 21 |

It can be seen from the results set forth above that the properties of the polymer mixtures of our invention are superior to the properties of simple physical blends of chlorinated atactic polypropylene and chlorinated ethylene:propylene copolymers.

Any departure from the above description which conforms to the present invention is intended to be included within the scope of the invention as defined by the following claims.

We claim:

1. A method for the preparation of chlorinated polyolefin polymer mixtures comprising chlorinating an organic solvent solution of a mixture of atactic polypropylene and an ethylene:propylene copolymer, said chlorination being conducted in the presence of a free radical catalyst; wherein the ratio of atactic polypropylene to ethylene:propylene copolymer ranges from 30:70 to 70:30; wherein said ethylene:propylene copolymer has a ratio of ethylene:propylene ranging from 60:40 to 70:30; and wherein the amount of chlorine in the resulting chlorinated polymer mixture ranges from 10 to 60%, by weight, of said polymer mixture.

2. The method of claim 1, wherein the chlorination of said organic solvent solution is conducted by passing chlorine gas into said solution.

3. The method of claim 1, wherein the chlorination of said organic solvent solution is conducted by refluxing said solution with sulfuryl chloride.

4. The method of claim 1, wherein said ethylene: propylene copolymer has a Mooney viscosity ranging from 20 to 90.

5. The method of claim 1, wherein the amount of said free radical catalyst ranges from 0.1% to 1.0%, by weight, as based on the total weight of the mixture of atactic polypropylene and the ethylene:propylene copolymer.

6. A chlorinated polymer mixture of atactic polypropylene and an ethylene:propylene copolymer; wherein the amount of chlorine in said chlorinated polymer mixture ranges from 10 to 60%, by weight, of said polymer mixture; wherein the ratio of atactic polypropylene to ethylene:propylene copolymer ranges from 30:70 to 70:30; and wherein said ethylene:propylene copolymer has a ratio of ethylene:propylene ranging from 60:40 to 70:30.

7. The chlorinated polymer mixture of claim 6, wherein said ethylene:propylene copolymer has a Mooney viscosity ranging from 20 to 90 and a ratio of ethylene: propylene ranging from 60:40 to 70:30.

8. The chlorinated polymer mixture of claim 6, wherein the ratio of atactic polypropylene to ethylene:propylene copolymer ranges from 30:70 to 70:30.

9. The chlorinated polymer mixture of claim 6, wherein said polymer mixture is in the form of an organic solvent solution.

10. A substrate coated with the dried consolidated residue of a chlorinated polymer mixture of atactic polypropylene and an ethylene:propylene copolymer as obtained by the method of claim 1.

References Cited by the Examiner

UNITED STATES PATENTS

| | | | |
|---|---|---|---|
| 2,748,105 | 5/1956 | Becker et al. | 260—96 |
| 2,849,431 | 8/1958 | Baxter | 260—96 |
| 2,968,637 | 1/1961 | Bowers | 260—29.6 |
| 3,062,795 | 11/1962 | Cain et al. | 260—96 |

FOREIGN PATENTS 586,442   12/1958   Italy.

MURRAY TILLMAN, *Primary Examiner.*

LEON J. BERCOVITZ, *Examiner.*

E. B. WOODRUFF, J. L. WHITE, *Assistant Examiners.*